US012308545B2

(12) United States Patent
Jin et al.

(10) Patent No.: US 12,308,545 B2
(45) Date of Patent: May 20, 2025

(54) CONNECTOR FOR A CIRCUIT BOARD

(71) Applicants: Tyco Electronics (Shanghai) Co. Ltd., Shanghai (CN); Tyco Electronics Holdings (Bermuda) No. 7 Limited, Hamilton (BM)

(72) Inventors: Jiwang (Arthur) Jin, Shanghai (CN); Wenyu (Vindy) Liu, Shanghai (CN); Xingjie (Steven) Ge, Shanghai (CN); Kuo-Wei Chang, Taipei (TW)

(73) Assignees: Tyco Electronics (Shanghai) Co., Ltd., Shanghai (CN); Tyco Electronics Holdings (Bermuda) No. 7 Limited, Hamilton (BM)

( * ) Notice: Subject to any disclaimer, the term of this patent is extended or adjusted under 35 U.S.C. 154(b) by 357 days.

(21) Appl. No.: 17/876,665

(22) Filed: Jul. 29, 2022

(65) Prior Publication Data

US 2023/0035520 A1 Feb. 2, 2023

(30) Foreign Application Priority Data

Jul. 29, 2021 (CN) ......................... 202110868589.7

(51) Int. Cl.

| | |
|---|---|
| ***H01R 12/71*** | (2011.01) |
| ***H01R 13/24*** | (2006.01) |
| ***H01R 13/502*** | (2006.01) |
| ***H01R 13/514*** | (2006.01) |
| ***H01R 13/629*** | (2006.01) |
| ***H01R 43/16*** | (2006.01) |
| *H01R 107/00* | (2006.01) |

(52) U.S. Cl.
CPC ........... *H01R 12/716* (2013.01); *H01R 13/24* (2013.01); *H01R 13/502* (2013.01); *H01R 13/514* (2013.01); *H01R 13/629* (2013.01); *H01R 43/16* (2013.01); *H01R 2107/00* (2013.01)

(58) Field of Classification Search
CPC .... H01R 12/716; H01R 13/24; H01R 13/502; H01R 13/514; H01R 13/629; H01R 43/16; H01R 13/42
See application file for complete search history.

(56) References Cited

U.S. PATENT DOCUMENTS

2011/0103752 A1* 5/2011 Little ........................ G02B 6/32 385/139

* cited by examiner

*Primary Examiner* — Michael C Zarroli
(74) *Attorney, Agent, or Firm* — Barley Snyder

(57) ABSTRACT

A connector includes a housing having a cavity and a terminal assembly accommodated in the cavity and including a first terminal. The first terminal has a first mating portion, a first connecting portion, and a first mating beam extending from the first mating portion to the first connecting portion. The terminal assembly includes an inserting block usable with the first terminal and having an inserting block frame. The inserting block frame has a first passage and a preloading portion. The first passage allows the first mating beam to pass therethrough. The preloading portion supports the first mating beam and applies a pre-pressing force to the first mating beam.

19 Claims, 7 Drawing Sheets

CONNECTOR FOR A CIRCUIT BOARD

CROSS-REFERENCE TO RELATED APPLICATION

This application claims the benefit of the filing date under 35 U.S.C. § 119(a)-(d) of Chinese Patent Application No. 202110868589.7, filed on Jul. 29, 2021.

FIELD OF THE INVENTION

Embodiments of the disclosure generally relate to the field of signal transmission, and in particular to a connector.

BACKGROUND

A connector commonly comprises two rows of conductive terminals, i.e., upper and lower conductive terminals. Ends of the two rows of conductive terminals are connected as connecting portions to a main circuit board and the other ends of the two rows of conductive terminals are used as mating portions to contact and mate with an inserted male circuit board, so as to form an electrical connection between the main circuit board and the male circuit board, thereby transmitting signals between the main circuit board and the male circuit board.

In order to ensure a good mating connection between the mating portions and the male circuit board during mating and to prevent damage to the mating portions, the mating portion of the conductive terminal of the existing connector is usually bent. After mating, a length from a contact point of the mating portion in contact with the male circuit board to a free end of the mating portion is often too long, which results in electrical stubs that will degrade the electrical performance of the connector and thus reduce the ability to transmit signals. In addition, the mating portions of the conductive terminals of the existing connector usually adopt the traditional inverted hump bends, which will lead to the generation of unmatched impedance, thereby also reducing the electrical performance of the connector.

SUMMARY

A connector includes a housing having a cavity and a terminal assembly accommodated in the cavity and including a first terminal. The first terminal has a first mating portion, a first connecting portion, and a first mating beam extending from the first mating portion to the first connecting portion. The terminal assembly includes an inserting block usable with the first terminal and having an inserting block frame. The inserting block frame has a first passage and a preloading portion. The first passage allows the first mating beam to pass therethrough. The preloading portion supports the first mating beam and applies a pre-pressing force to the first mating beam.

BRIEF DESCRIPTION OF THE DRAWINGS

The invention will now be described by way of example with reference to the accompanying Figures, of which.

DETAILED DESCRIPTION OF THE EMBODIMENTS

Figure 1:
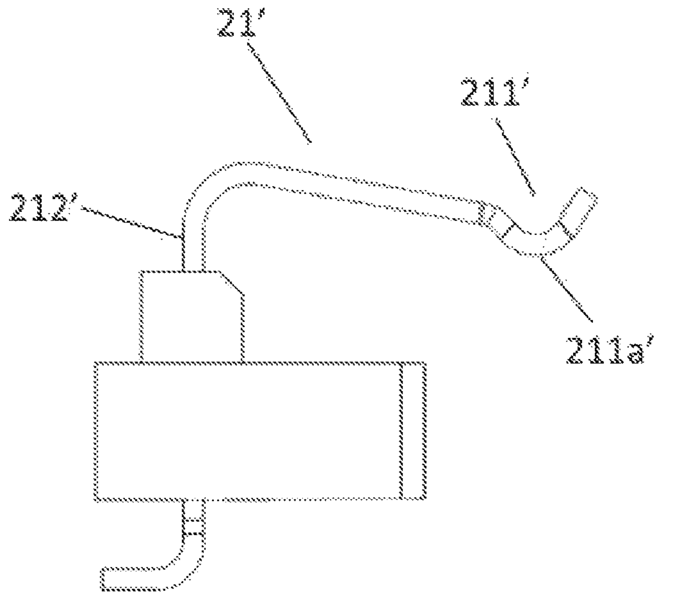
FIG. 1 schematic structural view of a conventional terminal.

In order to illustrate the present disclosure more clearly, the embodiments of the present disclosure will be described in detail below with reference to the accompanying drawings. It should be understood that the following description of the embodiments is intended to explain and illustrate the general concept of the present disclosure, and should not be construed as limiting the present disclosure. In the specification and drawings, the same or similar reference numbers refer to the same or similar components or parts. For the purpose of clarity, the accompanying drawings are not necessarily drawn in proportion and some well-known components and structures may be omitted from the accompanying drawings.

Unless otherwise defined, technical or scientific terms used in the present disclosure should have the ordinary meaning as understood by one of ordinary skill in the art to which the present disclosure belongs. The terms "first", "second" and similar terms used herein do not denote any order, quantity, or importance, but are merely used to distinguish different components. The wording "a" or "an" does not exclude a plurality. "Comprising" or "including" and similar words are intended to mean that the elements or items appearing before the words encompass the elements or items recited after the words and their equivalents, but do not exclude other elements or items. Words like "connected to" or "connected with" are not limited to physical or mechanical connections, but may comprise electrical connections, whether direct or indirect. Terms such as "up", "down", "left", "right", "top" or "bottom" are only used to indicate relative positional relationship, the relative positional relationship may also change correspondingly if the absolute position of the described object changes. When an element is referred to as being "above" or "below" another element, it can be "directly above" or "directly below" another element or there may be an intervening element.

As shown in FIGS. 2 to 9, embodiments of the present disclosure provide a connector. The connector comprises a housing 1, a terminal assembly 2, and a second terminal 3. The housing 1 is provided with a cavity in which the terminal assembly 2 and the second terminal 3 are to be accommodated. The terminal assembly 2 comprises a first terminal 21, an inserting block 22 for the first terminal 21 and a holder 23 for the first terminal 21. Hereinafter, each of the specific components of the connector of the embodiments will be described in detail with reference to the specific accompanying drawings.

Figure 5:
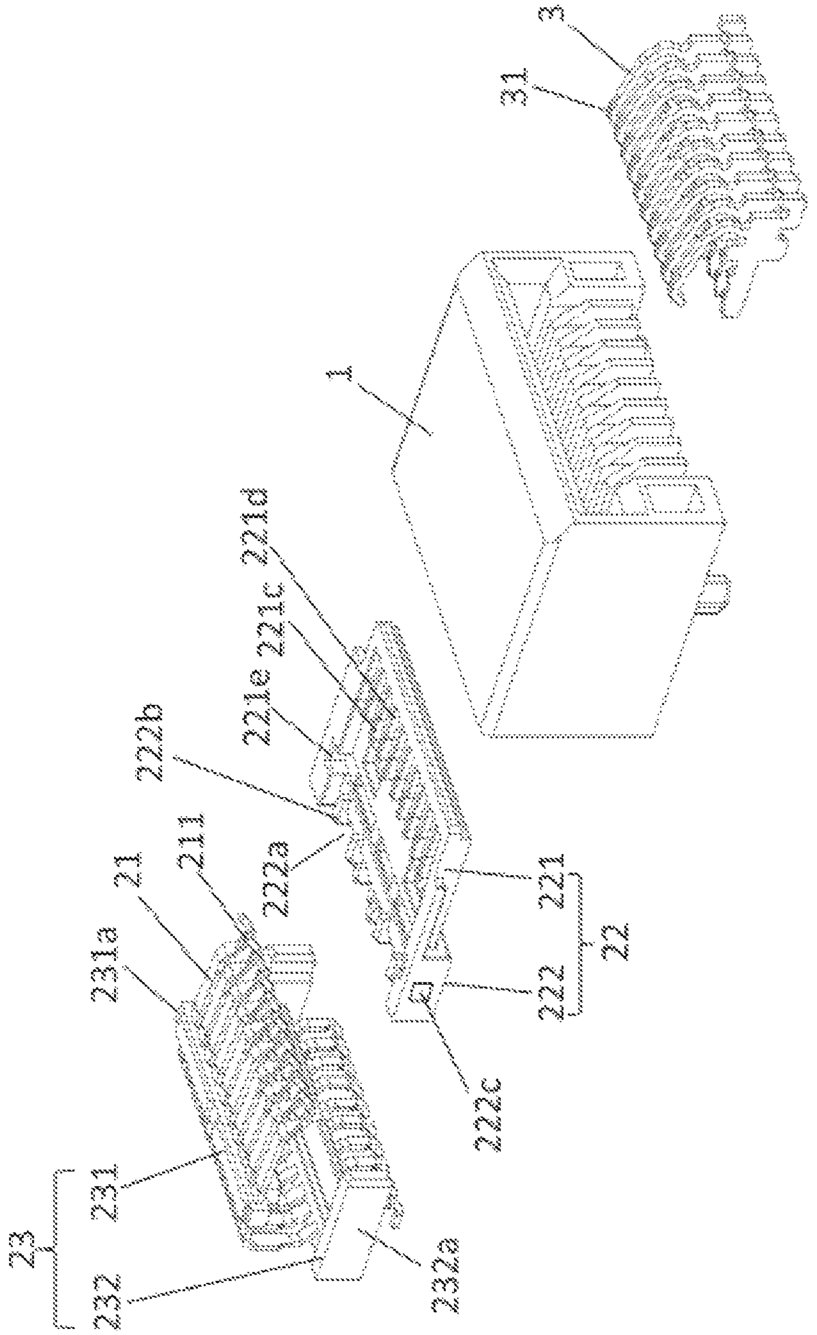
FIG. 5 is a schematic exploded structural view of a connector according to an embodiment of the present disclosure.

As shown for example in FIG. 5, the first terminals 21 and the second terminals 3 of the present disclosure may be plural and may be arranged in a row. For the convenience of description, hereinafter, a single first terminal 21 and a single second terminal 3 are described as an example, but the present disclosure is not limited thereto, and the arrangement of the terminals in rows is also within the protection scope of the present disclosure.

Figure 2:
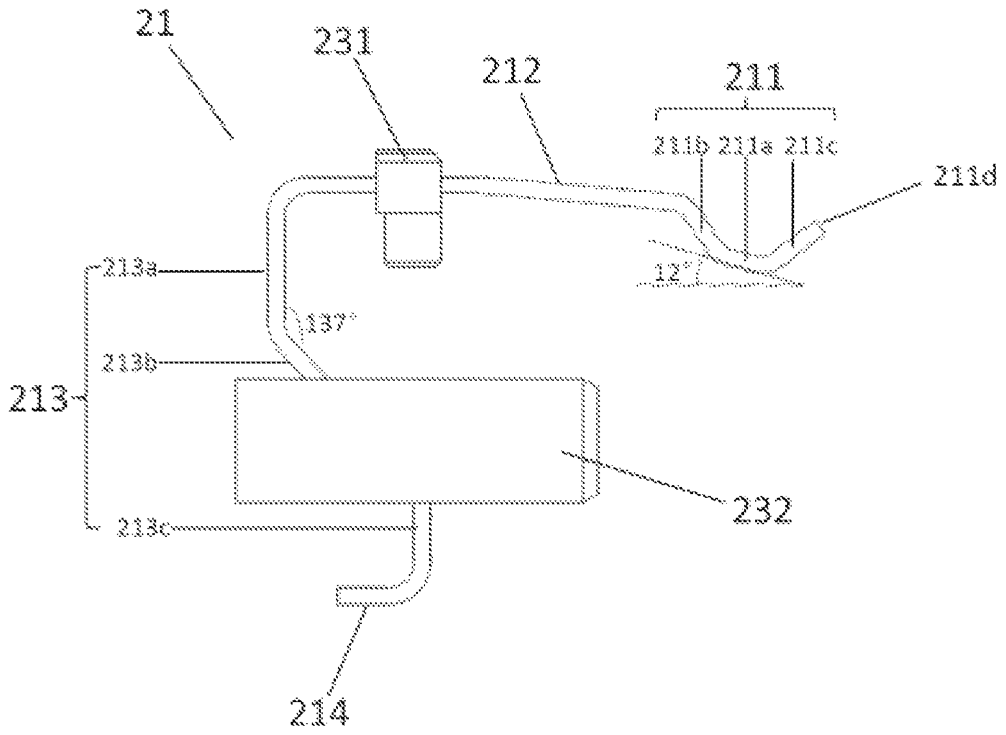
FIG. 2 is a schematic structural view of a first terminal according to an embodiment of the present disclosure.

Referring to FIG. 2, the first terminal 21 comprises a first mating portion 211, a first mating beam 212, a first transition beam 213, and a first connecting portion 214 in sequence from the right side. The first mating portion 211 is used for contacting and mating with the inserted male circuit board. The first mating beam 212 extends from the first mating portion 211 to the first connecting portion 214. The first transition beam 213 extends from the first mating beam 212 to the first connecting portion 214. The first connecting portion 214 is used for connecting with the main circuit board.

The first mating portion 211, as a whole, is configured to protrude towards the inserted male circuit board so as to be in a bent shape. As can be seen in FIG. 2, the first mating portion 211 is in a bent shape that is concave downwards as a whole. The first mating portion 211 comprises a coupling segment 211*a* for capacitive coupling with the inserted male circuit board, an engaging segment 211*b* extending from the first mating beam 212 to the coupling segment 211*a*, and a free segment 211*c* extending from the coupling segment 211*a* to a free end 211*d* of the first mating portion 211.

As shown in FIG. 2, the coupling segment 211*a* of the present disclosure is a straight segment, and the engaging segment 211*b* and the free segment 211*c* are each configured to form an angle with respect to the coupling segment 211*a*. The coupling segment 211*a* is a segment where a coupling effect is formed between the first mating portion 211 and the inserted male circuit board. The coupling segment 211*a* may not be a segment where the first mating portion 211 is in complete contact with the inserted male circuit board, and a segment where a coupling effect is formed between the first mating portion 211 and the inserted male circuit board could be referred to as the coupling segment. In an embodiment, the angle between the length direction of the coupling segment 211*a* and the contact surface of the inserted male circuit board (i.e., the surface of the male circuit board where the mating portion is in contact and mating with the first mating portion 211) is 11° to 13°, and in an embodiment may be 12° as shown in FIG. 2.

On the other hand, in the conventional terminal 21' shown in FIG. 1, the mating portion 211' thereof usually adopts the traditional inverted hump bending, and the coupling segment 211*a'* of the mating portion 211' is a curved segment, which usually leads to the generation of unmatched impedance, thereby reducing the electrical performance of the connector. Compared to the conventional terminal 21' in FIG. 1, the first mating portion 211 of the first terminal 21 of the present disclosure is configured such that the coupling segment 211 is formed as a straight segment and the angle between the length direction of the coupling segment 211 and the contact surface of the inserted male circuit is 11° to 13°, so that a coupling effect can be formed in the area in which the coupling segment 211*a* is in contact with the inserted male circuit board, thereby improving the high frequency impedance (e.g., 112 G high frequency impedance), reducing the unmatched impedance generated in the conventional terminal 21', thus improving the electrical performance of the connector.

The first transition beam 213 of the present disclosure, as shown in FIG. 2, includes a first straight segment 213*a*, an oblique segment 213*b*, and a second straight segment 213*c* successively extending from the first mating beam 212 to the first connecting portion 214. The first straight segment 213*a* is substantially perpendicular to and connected to the first mating beam 212, the oblique segment 213*b* extends from the first straight segment 213*a* to the interior of the cavity, and the second straight segment 213*c* is arranged in parallel to the first straight segment 213*a* and is substantially perpendicular to and connected to the first connecting portion 214. The angle between the oblique segment 213*b* and the first straight segment 213*a* is 135° to 139°, and in an embodiment 137°. The oblique segment 213*b* may be covered and fixed by the second fixing frame 232 of the holder 23 (to be described later).

On the other hand, in the conventional terminal 21' shown in FIG. 1, the transition beam 212' is a straight segment from top to bottom as a whole. Compared to the conventional terminal 21' in FIG. 1, the first transition beam 213 of the present disclosure is configured to have the oblique segment 213*b* extending from the first straight segment 213*a* to the interior of the cavity, the angle between the oblique segment 213*b* and the first straight segment 213*a* is 135° to 139° and the oblique segment 213*b* is covered and fixed by the second fixing frame 232 of the holder 23. This arrangement can achieve the smallest covering volume, reducing the space occupied by the first terminal 21, and improving the value of a crosstalk indicator, Integrated Crosstalk Noise (ICN), of the connector.

Figure 3:
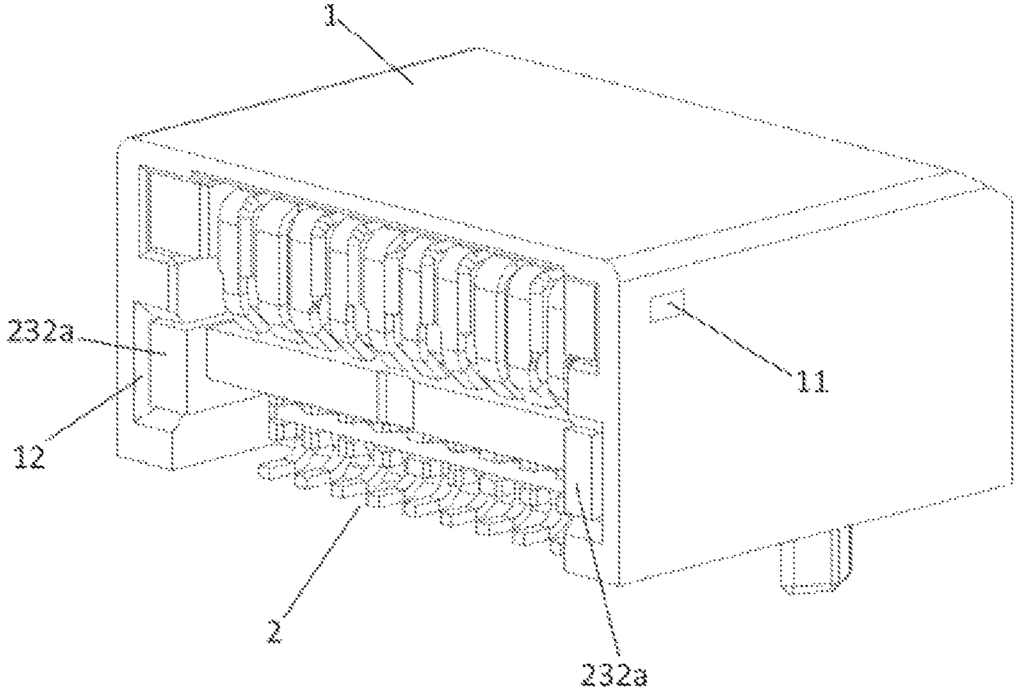
FIG. 3 is a schematic structural view of a front portion of a connector according to an embodiment of the present disclosure.
Figure 4:
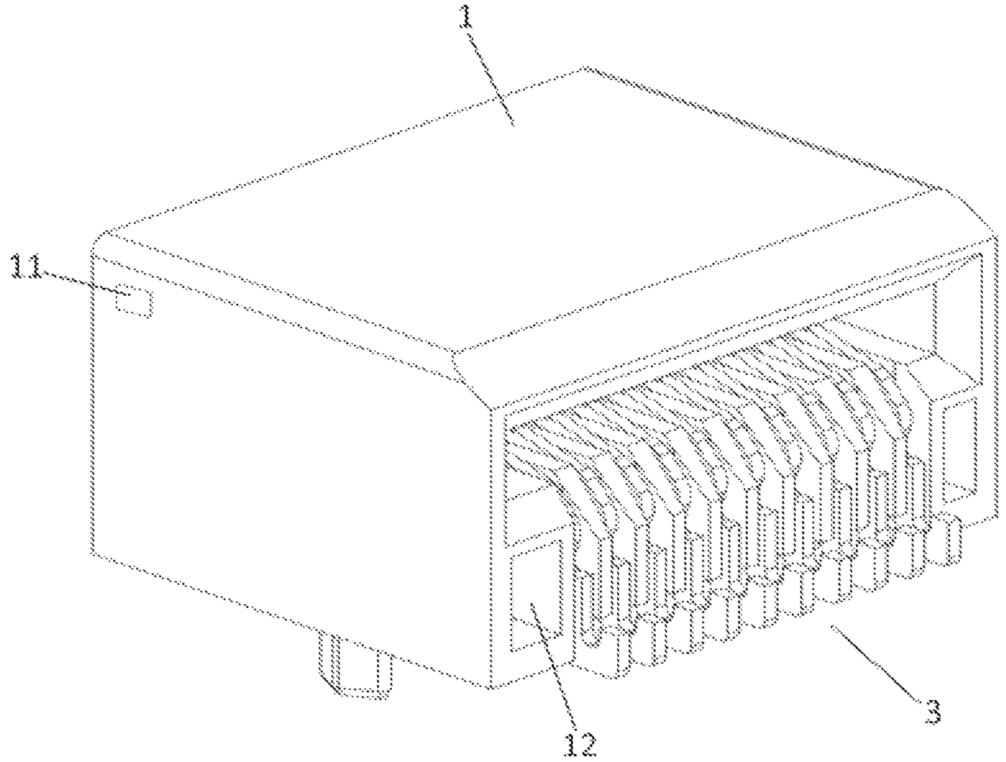
FIG. 4 is a schematic structural view of a rear portion of a connector according to an embodiment of the present disclosure.
Figure 6:
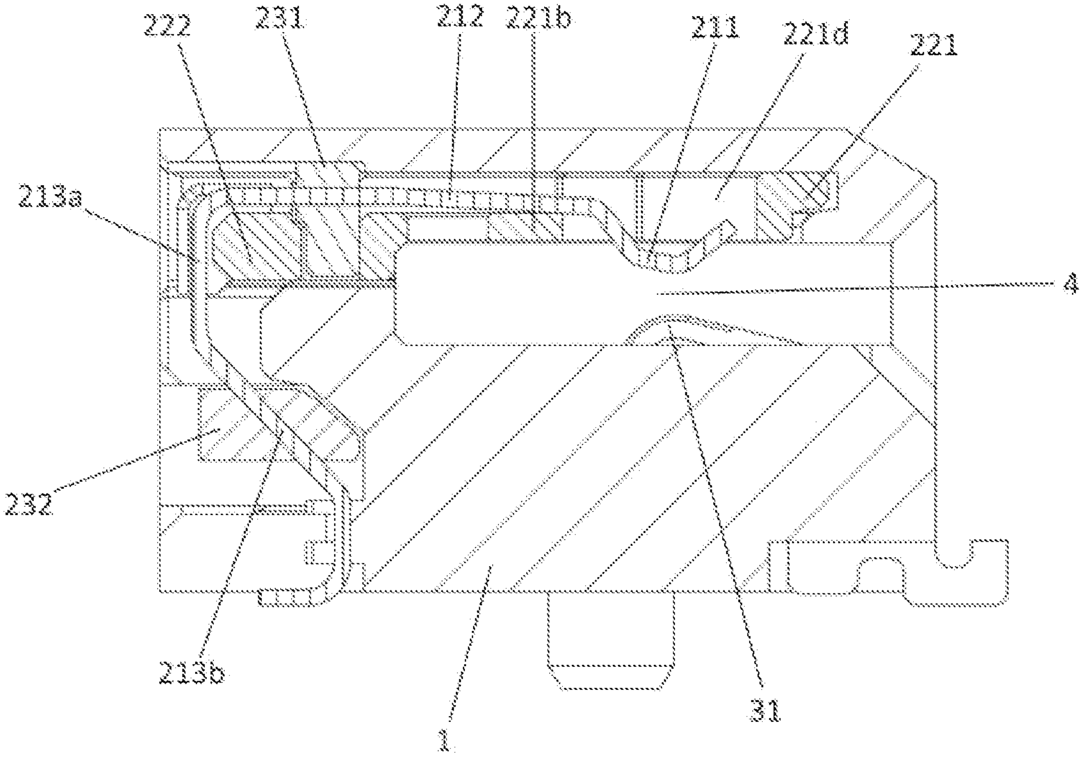
FIG. 6 is a cross-sectional view of a connector according to an embodiment of the present disclosure.

The second terminal 3 is used in cooperation with the first terminal 21 of the terminal assembly 2. The second terminal 3 comprises a second mating portion 31, as shown in FIG. 5, and the first mating portion 211 and the second mating portion 31 are arranged opposite to each other, thereby defining the mating area 4, in which the first mating portion 211 and the second mating portion 31 are in contact and mated with the inserted male circuit board, between the first mating portion 211 and the second mating portion 31, as shown in FIG. 6. The second terminal 3 of the present disclosure may be a lower row terminal of an off-the-shelf or existing SFP 56 G connector (i.e., a small pluggable connector with a transmission rate of 56 Gbps); that is, the second terminal 3 may be independent of the terminal assembly 2, and the inserting block 22 and the holder 23 of the present disclosure only act on the first terminal 21, but do not act on the second terminal 3, namely, do not fix and apply pressure to the second terminal 3. The first terminal 21 of the terminal assembly 2 of the present disclosure can be used as an upper row terminal in combination with the lower row terminal of the existing SFP 56 G connector, and can share the assembly automatic production line of the existing SFP 56 G connector, and can also reuse other components of the SFP 56 G connector, thereby reducing the cost of production and usage. When assembling the connector, the terminal assembly 2 is loaded into the cavity from the front of the housing 1, and the second terminal 3 is loaded into the cavity from the rear of the housing 1, as shown in FIGS. 3 and 4.

As shown in FIGS. 5, 6, 8 and 9, the inserting block 22 comprises an inserting block frame 221 and an additional frame 222 extending from the inserting block frame 221 in a direction facing towards the inserted male circuit board.

The inserting block frame 221 has a first passage 221*a*, a preloading portion 221*b*, a first partition wall 221*c* and a first through hole 221*d*, and the preloading portion 221*b* is located in the first passage 221*a*. Obviously, in the case where a plurality of the first terminals are arranged in a row, there are a plurality of first passages 221*a*, a plurality of first partition walls 221*c* and a plurality of first through holes 221*d*. Two adjacent first partition walls 221*c* define a first passage 221*a*. The first passage 221*a* is configured to allow the first mating beam 212 to pass therethrough and to thereby position the first mating beam 212. The preloading portion 221*b* is configured to support the first mating beam 212 and apply a pre-pressing force to the first mating beam 212 in a direction substantially facing away from the inserted male circuit board, so that an elastic biasing force is generated by the first mating beam 212, and the elastic biasing force enables the first mating portion 211 to elastically bias the inserted male circuit board, thus the first mating portion 211 and the inserted male circuit board can be well contacted and mated with each other. The first through hole 221*d* is configured to lead to the corresponding first passage 221*a*, and the first mating portion 211 is configured to pass through the first through hole 221*d* to reach the mating area 4 where the first mating portion 211 is in contact and mated with an inserted male circuit board, and as shown in FIG. 6, the free segment 211*c* of the first mating portion 211 may extend into the first through hole 221*d.*

The additional frame 222 is formed with a second passage 222*a* and a second partition wall 222*b*, as shown in FIG. 5. In the case where a plurality of the first terminals are arranged in a row, there are a plurality of second passages 222*a* and a plurality of second partition walls 222*b*. Two adjacent second partition walls 222*b* define a second passage 222*a*. The second passage 222*a* is configured to allow the first straight segment 213*a* to pass therethrough and to thereby position the first straight segment 213*a*. There may be lateral protrusions 222*c* on either side of the additional frame 222, and the additional frame 222 may be fixed on the housing 1 by accommodating the lateral protrusions 222*c* in the insertion holes 11 of the housing 1.

With reference to FIGS. 3 and 5, the holder 23 comprises a first fixing frame 231 arranged above the inserting block 22 and a second fixing frame 232 arranged below the inserting block 22. The first fixing frame 231 is configured to cover around the first mating beam 212 and fix the first mating beam 212, and the second fixing frame 232 is configured to cover around the oblique segment 213*b* of the first transition beam 213 and fix the oblique segment 213*b*. The first fixing frame 231 is provided with a mounting protrusion 231*a*, and the first fixing frame 231 is installed on the inserting block frame 221 by accommodating the mounting protrusion 231*a* in the installation groove 221*e* of the inserting block frame 221. There is an insert 232*a*, which extends in the front-rear direction of the housing 1, on either side of the second fixing frame 232, and the second fixing frame 232 can be installed on the on the housing 1 by inserting the insert 232*a* into the corresponding slot 12 on the inner wall of the housing.

Figure 7:
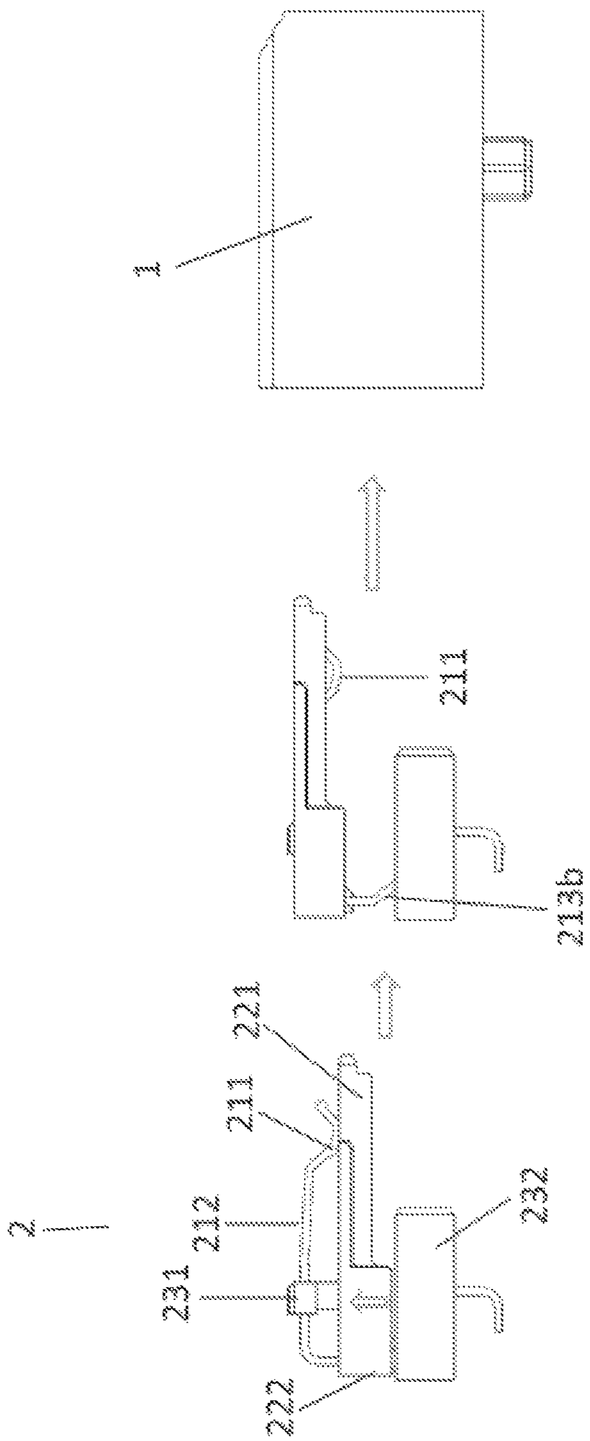
FIG. 7 illustrates an assembly process of a terminal assembly and an assembly process of assembling the terminal assembly into a housing, according to an embodiment of the present disclosure.
Figure 8:
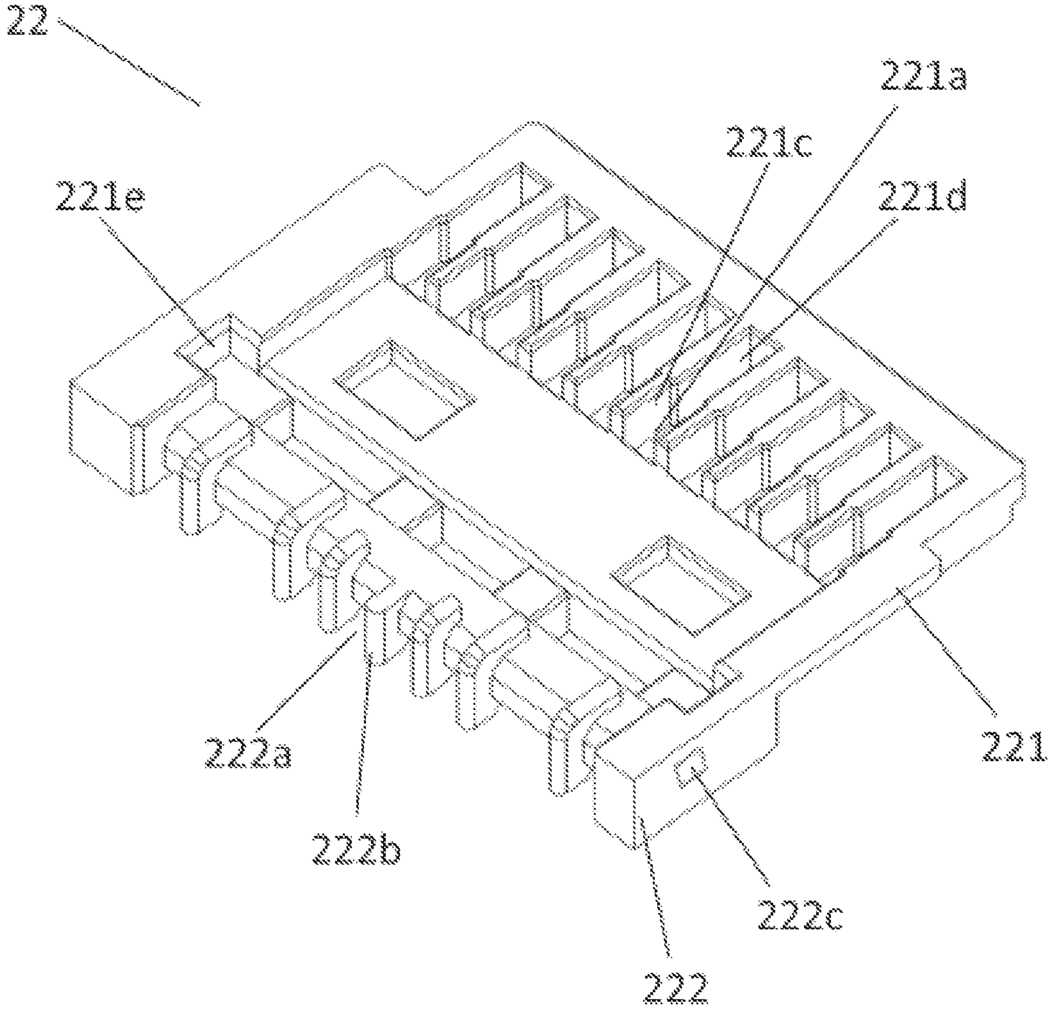
FIG. 8 is a schematic structural view of an inserting block according to an embodiment of the present disclosure.
Figure 9:
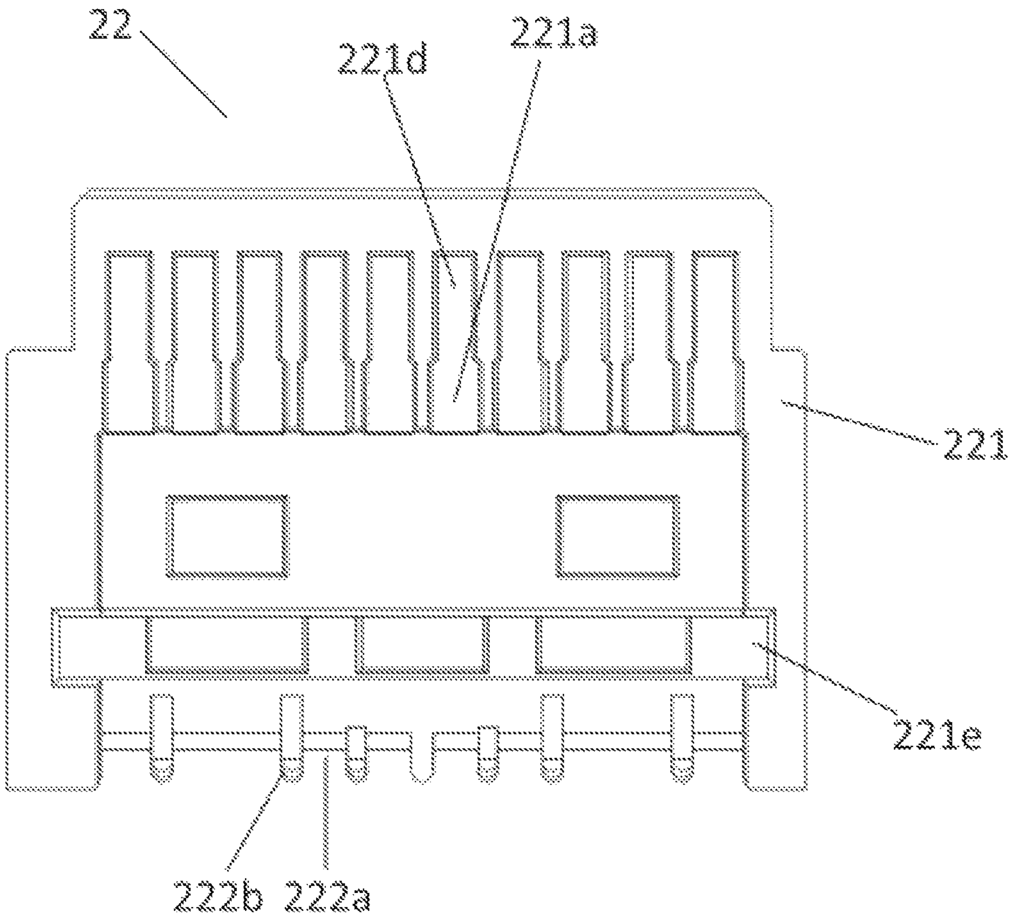
FIG. 9 is a top view of an inserting block according to an embodiment of the present disclosure.

FIG. 7 shows the process of assembling the terminal assembly 2 itself and the process of assembling the assembled terminal assembly 2 into the housing 1. As shown in FIG. 7, during assembling of the terminal assembly 2, firstly, the first fixing frame 231 and the second fixing frame 232 are used to cover and fix the first mating beam 212 and the oblique segment 213*b* of the first transition beam 213 respectively, and then the first straight segment 213*a* of the first transition beam 213 is aligned with and accommodated into the second passage 222*a* of the additional frame 222 of the inserting block 22. Next, the inserting block 22 is moved upwards as a whole, and during the movement, the first mating beam 212 is accommodated into the first passage 221*a* of the inserting block frame 221, and the preloading portion 221*b* in the first passage 221*a* gradually props up the first mating beam 212 so that the first mating beam 212 is deflected upwards. Thus a substantially upwards pre-pressing force is applied to the first mating beam 212 and a downward elastic biasing force is generated by the first mating beam 212, resulting in that the first mating portion 211 is elastically biased downwards against the inserted male circuit board, and at the same time, the first through hole 221*d* of the inserting block frame 221 also passes through the first mating portion 211. This leaves most of the engaging segment 211*b* and a part of the free segment 211*c* of the first mating portion 211 in the first through hole 221*d*, while the coupling segment 211*a* of the first mating portion 211 is exposed below and outside the first through hole 221*d*. At this point, the assembling of the terminal assembly 2 is finished. Then, the assembled terminal assembly 2 is loaded into the cavity of the housing 1 from the front of the housing 1, thereby finishing the assembling of the terminal assembly 2 in the housing 1. The covered first terminal 21 is not directly (immediately) inserted into the housing 1, but is first assembled with the inserting block 22, and then inserted into the housing 1 together with the inserting block 22.

In the embodiments of the present disclosure, the preloading portion 221*b* is provided with the first mating beam 212 positioned higher than the natural position of the first mating beam 212, so that an elastic biasing force is generated by the first terminal 21, which ensures the stability of high springing of the first terminal 21 and provides sufficient contact force for the contact between the first mating portion 211 and the male circuit board (for example, the contact with the plug head of the male circuit board). This reduces the amount of upward deflection of the first mating beam 212 (i.e., in a direction facing away from the inserted male circuit board) required to maintain the electrical connection between the first mating portion 211 and the inserted male circuit board, such that the length from the contact point of the first mating portion 211 in contact with the male circuit board to the free end 211*d* of the first mating portion 211 is reduced compared to that in the absence of the preloading portion. Thereby, the electrical stubs of the first terminal 21 are reduced compared to that in the absence of the preloading portion, so the electrical performance of this connector will not be decreased and high signal transmission capability is ensured. In addition, it can be ensured that the free end 211*d* of the first mating portion 211 (also referred to as the head of the first terminal 21) does not reach and contact the lower surface of the housing 1 since the above-mentioned amount of upward deflection of the first mating portion 211 is reduced, thereby preventing the free end 211*d* from being forced to penetrate the housing 1 due to the insertion of the male circuit board.

Compared to existing connectors (such as SFP 56 G connectors), the connector of the present disclosure can effectively realize high-speed transmission of signals, for example, can realize efficient transmission of 112 Gbps PM4/56 Gbps NRZ (non-return-to-zero code) signals, and can realize compatibility with various male circuit boards (such as 10 G/28 G/56 G optical module circuit boards). Additionally, the connector of the present invention can also be applied with use of the lower row terminals and the automatic assembly line of the existing connector (such as SFP 56 G connector), thus greatly reducing the cost of production and use.

Those skilled in the art can understand that the above-described embodiments are all exemplary, and those skilled in the art can make improvements thereto, and the structures described in the various embodiments can be freely combined without a structure or principle conflicting.

Although the present disclosure has been described with reference to the accompanying drawings, the embodiments disclosed in the accompanying drawings are intended to illustrate the embodiments of the present disclosure and should not be construed as a limitation to the present disclosure. The dimension ratios in the accompanying drawings are only schematic and should not be construed as limiting the present disclosure.

The above embodiments are only illustrative of the principles and construction of the present disclosure, rather than limiting the present disclosure. Those skilled in the art should understand that any change and modification to the present disclosure without departing from the general concept of the present disclosure are all within the scope of the present disclosure. The protection scope of the present disclosure shall be subjected to the scope defined by the attached claims.

What is claimed is:

1. A connector, comprising:

a housing having a cavity;

a terminal assembly accommodated in the cavity and including a first terminal, the first terminal has a first mating portion, a first connecting portion, and a first mating beam extending from the first mating portion to the first connecting portion, the terminal assembly includes an inserting block usable with the first terminal and having an inserting block frame, the inserting block frame has a first passage and a preloading portion, the first passage allows the first mating beam to pass therethrough, the preloading portion supports the first mating beam and applies a pre-pressing force to the first mating beam; and a second terminal separated from the terminal assembly and accommodated in the cavity, the second terminal has a second mating portion, the first mating portion and the second mating portion are arranged opposite to each other so as to define a mating area between the first mating portion and the second mating portion, in which the first mating portion and the second mating portion are in contact and mated with an inserted male circuit board, the inserted male circuit board arranged in the mating area between the first mating portion and the second mating portion.

2. The connector of claim 1, wherein the inserting block frame has a pair of first partition walls adjacent to one another and defining the first passage.

3. The connector of claim 1, wherein the inserting block frame has a first through hole leading to the first passage, the first mating portion passes through the first through hole to reach a mating area where the first mating portion contacts and mates with an inserted male circuit board.

4. The connector of claim 1, wherein the first mating portion protrudes toward an inserted male circuit board and has a bent shape, the first mating portion has a coupling segment for coupling with the inserted male circuit board, the coupling segment is a straight segment, an angle between a length direction of the coupling segment and a contact surface of the inserted male circuit board is 11° to 13°.

5. The connector of claim 4, wherein the first mating portion has an engaging segment extending from the first mating beam to the coupling segment and a free segment extending from the coupling segment to a free end of the first mating portion, the engaging segment and the free segment form an angle with the coupling segment.

6. The connector of claim 2, wherein the first mating portion protrudes toward an inserted male circuit board and has a bent shape, the first mating portion has a coupling segment for coupling with the inserted male circuit board, the coupling segment is a straight segment, an angle between a length direction of the coupling segment and a contact surface of the inserted male circuit board is 11° to 13°.

7. The connector of claim 3, wherein the first mating portion protrudes toward an inserted male circuit board and has a bent shape, the first mating portion has a coupling segment for coupling with the inserted male circuit board, the coupling segment is a straight segment, an angle between a length direction of the coupling segment and a contact surface of the inserted male circuit board is 11° to 13°.

8. The connector of claim 1, wherein, during assembling the connector, the terminal assembly is loaded into the cavity from a front of the housing and the second terminal is loaded into the cavity from a rear of the housing.

9. A connector, comprising:

a housing having a cavity; and a terminal assembly accommodated in the cavity and including a first terminal, the first terminal has a first mating portion, a first connecting portion, and a first mating beam extending from the first mating portion to the first connecting portion, the terminal assembly includes an inserting block usable with the first terminal and having an inserting block frame, the inserting block frame has a first passage and a preloading portion, the first passage allows the first mating beam to pass therethrough, the preloading portion supports the first mating beam and applies a pre-pressing force to the first mating beam, wherein:

the first terminal has a first transition beam extending from the first mating beam to the first connecting portion; and the first transition beam has a first straight segment, an oblique segment, and a second straight segment extending in sequence from the first mating beam to the first connecting portion, the first straight segment is perpendicular to and connected to the first mating beam, the oblique segment extends from the first straight segment to the interior of the cavity, and the second straight segment is parallel to the first straight segment and perpendicular to and connected to the first connecting portion.

10. The connector of claim 9, wherein an angle between the oblique segment and the first straight segment is 135° to 139°.

11. The connector of claim 9, wherein the inserting block has an additional frame extending from the inserting block frame in a direction facing toward an inserted male circuit board, the additional frame has a second passage allowing the first straight segment to pass therethrough and to position the first straight segment.

12. The connector of claim 11, wherein the additional frame has a pair of second partition walls adjacent to one another and defining the second passage.

13. The connector of claim 11, wherein the additional frame has a lateral protrusion, the additional frame is fixed on the housing by accommodating the lateral protrusion in an insertion hole of the housing.

14. The connector of claim 9, wherein the terminal assembly includes a holder usable with the first terminal and having a first fixing frame arranged above the inserting block and a second fixing frame arranged below the inserting block, the first fixing frame extends around the first mating beam and fixes the first mating beam, the second fixing frame extends around the oblique segment and fixes the oblique segment.

15. The connector of claim 14, wherein the first fixing frame has a mounting protrusion, the first fixing frame is installed on the inserting block frame by accommodating the mounting protrusion in an installation groove of the inserting block frame.

16. The connector of claim 14, wherein the second fixing frame has an insert, the second fixing frame is installed on the housing by inserting the insert into a slot formed in the inner wall of the housing.

17. The connector of claim 9, wherein the first mating portion protrudes toward an inserted male circuit board and has a bent shape, the first mating portion has a coupling segment for coupling with the inserted male circuit board, the coupling segment is a straight segment, an angle between a length direction of the coupling segment and a contact surface of the inserted male circuit board is 11° to 13°.

18. The connector of claim 9, wherein the first mating portion protrudes toward an inserted male circuit board and has a bent shape, the first mating portion has a coupling segment for coupling with the inserted male circuit board, the coupling segment is a straight segment, an angle between a length direction of the coupling segment and a contact surface of the inserted male circuit board is 11° to 13°.

19. A connector, comprising:

a housing having a cavity; and a terminal assembly accommodated in the cavity and including a first terminal, the first terminal has a first mating portion, a first connecting portion, and a first mating beam extending from the first mating portion to the first connecting portion, the terminal assembly includes an inserting block usable with the first terminal and having an inserting block frame, the inserting block frame has a first passage and a preloading portion, the first passage allows the first mating beam to pass therethrough, the preloading portion contacting the first mating beam between the first mating portion and the first connecting portion and applies a pre-pressing force to the first mating beam, the first mating portion passes through the inserting block frame to reach a mating area where the first mating portion contacts and mates with an inserted male circuit board, the preloading portion contacting the first mating beam on a side of the inserted male circuit board and biasing the first mating beam in a direction away from the mating area and the inserted male circuit board.

* * * * *